(12) United States Patent
Sidhu et al.

(10) Patent No.: US 8,568,647 B2
(45) Date of Patent: Oct. 29, 2013

(54) METHODS OF FABRICATING STRUCTURAL ELEMENTS

(75) Inventors: Jagjit Sidhu, Bristol (GB); Jennifer L McDonald, Bristol (GB); Sandeep S. P Raja, Bristol (GB)

(73) Assignee: BAE Systems PLC, London (GB)

( * ) Notice: Subject to any disclaimer, the term of this patent is extended or adjusted under 35 U.S.C. 154(b) by 285 days.

(21) Appl. No.: 12/301,348

(22) PCT Filed: Nov. 6, 2008

(86) PCT No.: PCT/GB2008/051032
§ 371 (c)(1),
(2), (4) Date: Aug. 11, 2009

(87) PCT Pub. No.: WO2009/060234
PCT Pub. Date: May 14, 2009

(65) Prior Publication Data
US 2010/0207299 A1     Aug. 19, 2010

(30) Foreign Application Priority Data

Nov. 9, 2007  (EP) .................................. 07270065
Nov. 9, 2007  (GB) ................................. 0722007.2

(51) Int. Cl.
    *B29C 35/08* (2006.01)
(52) U.S. Cl.
    USPC ............ 264/497; 264/259; 264/400; 264/494
(58) Field of Classification Search
    USPC .................................. 264/497, 400, 494, 259
    See application file for complete search history.

(56) References Cited

U.S. PATENT DOCUMENTS

| 4,727,751 A | 3/1988 | Holmes et al. |
| 6,508,909 B1 | 1/2003 | Cerezo Pancorbo |
| 2006/0138079 A1* | 6/2006 | Potyrailo et al. ................ 216/39 |
| 2007/0132280 A1 | 6/2007 | Wolf |

FOREIGN PATENT DOCUMENTS

| EP | 1 134 070 A1 | 9/2001 |
| EP | 1134070 A1 | 9/2001 |
| EP | 1846293 * | 8/2006 |
| GB | 2 228 224 A | 8/1990 |
| JP | 2005 068280 A | 3/2005 |
| JP | 2005-68280 | 11/2008 |
| WO | 02/077599 A2 | 10/2002 |
| WO | 02/081303 A | 10/2002 |
| WO | 02/081303 A1 | 10/2002 |

(Continued)

OTHER PUBLICATIONS

International Search Report in related application No. PCT/GB2008/051032 mailed Jan. 28, 2009.

(Continued)

*Primary Examiner* — Robert J Grun
(74) *Attorney, Agent, or Firm* — Pillsbury Winthrop Shaw Pittman LLP

(57) ABSTRACT

A method of fabricating structural elements on the surface of a component is provided. The structural elements are configured to modify flow of a fluid passing over the surface. Conveniently, the fabrication is performed using a Direct Write technique. A three dimensional element is formed by depositing material on the surface, and subsequently curing the deposited material.

26 Claims, 5 Drawing Sheets

(56) References Cited

FOREIGN PATENT DOCUMENTS

| WO | WO02081303 | * | 10/2002 |
| WO | 2006/097522 A | | 9/2006 |
| WO | 2006/097522 A1 | | 9/2006 |
| WO | WO2006097522 | * | 9/2006 |
| WO | 2007/034240 A2 | | 3/2007 |
| WO | 2007034240 A | | 3/2007 |

OTHER PUBLICATIONS

International Preliminary Report on Patentability in related application No. PCT/GB2008/051032 mailed May 11, 2010.
British Search Report issued in GB0722007.2, Apr. 15, 2008, 6 pages.
European Search Report issued in EP07270065.1, Mar. 14, 2008, 8 pages.

* cited by examiner

METHODS OF FABRICATING STRUCTURAL ELEMENTS

CROSS REFERENCE TO RELATED APPLICATIONS

This is the U.S. National Phase of PCT/GB2008/051032, filed Nov. 6, 2008, which claims priority to British Application no. 0722007.2, filed Nov. 9, 2007, and European Application No. 07270065.1, filed Nov. 9, 2007, the entire contents of all of which are incorporated herein by reference.

This invention concerns improvements relating to methods of fabricating structural elements on a component surface, in particular as used in the aerospace industry.

In testing small scale models in small scale wind tunnels, the aerodynamicist uses a number of techniques to try to simulate full scale flow behaviour. These techniques include introduction of one of more irregularities to the surface of the model, such as vortex generators, lamina flow trip wires or walls and surface roughening. Conventionally, such features are introduced by bonding elements to the aerodynamic surface. Such elements are typically introduced in an ad-hoc manner which can be unreliable, inaccurate and difficult to reproduce. Furthermore, in order to secure these elements to the aerodynamic surface, each element must be provided with a base surface to which adhesive may be applied to enable a secure bond to be achieved.

Vortex generators are formed from three dimensional triangular shaped components which are adhered directly to the aerodynamic surface. Laminar flow trip wires and walls are provided by bonding L section strips across the flow or by adhering beads such as sand beads across the flow. Surface roughening is achieved by gluing sand or other similar particles to the surface directly. Each of these techniques is intended to modify the flow regime over the aerodynamic surface in a way that simulates the corresponding large scale phenomena. Each technique requires one or more elements to be bonded to the aerodynamic surface. As the fluid flows over the aerodynamic surface, the adhesive used or the base of the element to which adhesive is applied can cause disturbances in the flow in addition to those intended by the introduction of the elements themselves.

According to a first aspect, the present invention provides use of a technique to fabricate structural elements on the surface of a component, the structural elements being configured to modify flow of a fluid passing over the surface. Conveniently the technique used may comprise the steps of: i) forming a three dimensional element by depositing material on the surface; and ii) curing the deposited material. Conveniently, the technique used is a Direct Write technique. By forming the structural elements on the surface using a Direct Write technique, the elements can be accurately positioned and formed using precise placement of material. The formation of these elements is repeatable. Since the elements are formed directly on to the surface, for example an aerodynamic surface, no additional fixings are present which would create secondary disturbances in any fluid flow passing over the surface.

According to a second aspect, the present invention provides a method of fabricating a structural element on the surface of a component, the structural element being configured to modify flow of a fluid passing over the surface, the method comprising the steps of: i) forming a three dimensional element by depositing material on the surface; and ii) curing the deposited material.

Advantageously, the forming step may comprise depositing one or more layers of material on the surface; partially curing the, or each, layer of material by locally applying heat or radiation thereto; and depositing a subsequent layer of material upon the partially cured material.

Optionally, the elements may be formed from a passive material such as a thermosetting or thermoplastic epoxy in which case the fabricated elements are purely structural and their shapes are fixed. Example passive materials include heat curable dielectric inks or flexible silver ink (e.g. D2061120D3 and C2050712D58, each supplied by Gwent Electronic Materials—see website: www.g-e-m.com). Optionally, the elements may be formed from an electroactive material, for example, a piezoelectric material, a photoelectric material, a photochemical, material, a electrochemical material or any other material that performs a non-passive function. In other words, an active material as referred to in this description is a material that changes state or produces a reaction when acted on by an external activator, e.g. an external force. Example piezoelectric materials are ceramics (for example, quartz or lead zirconate titanate) or polymers (for example, Polyvinylidene Difluoride). The element may be a sensor for example a pressure sensor and comprise means for outputting a voltage. The element may be an actuator and comprise means for receiving a voltage. Means for receiving and/or outputting a voltage may be provided by interconnects formed on the surface using a Direct Write technique to provide electrical connection between the element and a control means.

Optionally, the elements may comprise passive materials and active materials such that a structural component having a fixed shape is provided having a means for sensing, for example a pressure sensor integral therewith.

The element may be machined after or during formation to improve the accuracy and definition of the shape thereof. The machining may be performed using a pulse power laser, for example an excimer laser (XeCL). The pulsed laser may be a pulsed $CO_2$ laser, a Q-switched Nd;YAG, or any laser with very short pulse length (i.e. femto or nano second), for example a Ti Sapphire laser.

The elements are formed by depositing layers of an ink, for example a metallic Ag ink onto a surface of a component. After deposition, material of the respective element is cured, for example by applying heat to the deposited material. Heat may be applied by inserting the component into an oven. However, topical heat may be applied by using a laser, a heat gun or through exposure to microwaves. Conveniently, the ink may be cured by exposing the deposited material to ultraviolet radiation.

The ink may be applied to the surface using a micro-nozzle that extrudes the ink onto the surface as it moves over the component. However other deposition processes may be used, for example through ink jet or micro-thermal techniques.

The elements may be formed on a surface of a vehicle. Conveniently, the vehicle is an aircraft. Conveniently, the aircraft is an unmanned aerial vehicle (UAV).

The above and further features of the invention are set forth in the appended claims and will be explained in the following by reference to various embodiments and Examples which are illustrated in the accompanying drawings in which:

Direct Write technology forms three dimensional electrical components onto complex surfaces by building up a layer of material in a predetermined pattern. The deposition is generally controlled by a CAD system and is therefore particularly accurate but is also particularly flexible and adjustable. The completely flat and non-intrusive nature of the deposited features makes them ideal for applications involving smooth, aerodynamic surfaces. Given the lack of protrusion, they are particularly appropriate in harsh environments where conventional wiring and electronic components would be exposed to aerodynamic forces, temperature fluctuations and humidity fluctuations. Furthermore, conventional wiring and electronic components would interfere with the air flow across the aerodynamic surfaces and so Direct Write is increasingly used in these circumstances to avoid such interference.

Conversely, in the techniques used in the present invention a modified Direct Write technique is used to form mesoscale structures or elements onto aerodynamic surfaces where disturbances are desirable. Such elements are formed by depositing multiple layers of material upon one another so that a protrusion is formed of a desired shape.

Figure 1:
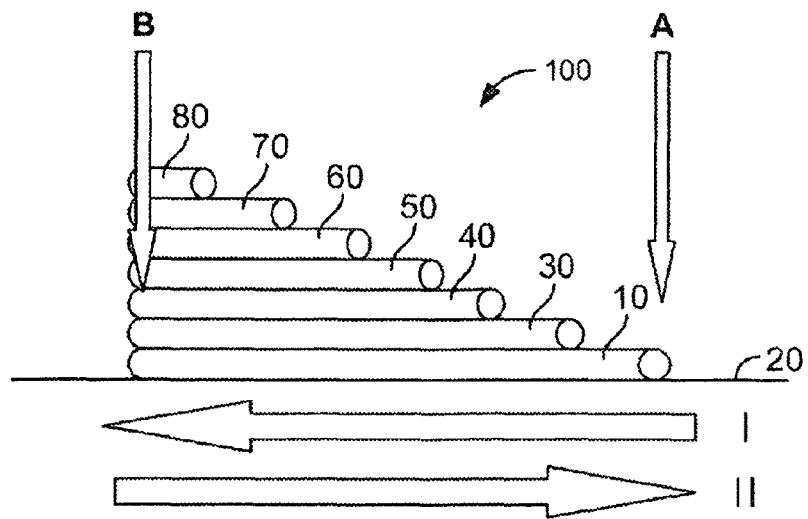
FIG. 1 illustrates a schematic representation of the formation of a vortex generator.

FIG. 1 illustrates such a technique. A first layer 10 is formed directly on a surface 20 by moving a print head from location A to location B as depicted by arrow I, the print head is instructed to deliver ink to the surface 20 as it is moved. The print head then returns from location B towards location A, as depicted by arrow II, but delivery of ink is stopped before the print head reaches location A. Thus a second layer 30 of material is deposited. Subsequent layers 40, 50, 60, 70, 80 are formed in a similar manner, as illustrated, to generate an element 100 of the desired shape. Control of the print head is undertaken by a CAD based system to ensure accurate deposition of material and formation of these mesoscale elements 100 directly on to the surface 20 without the use of bonding. Avoidance of bonding techniques and the additional material required by bonding avoids the generation of secondary disturbances to air flow over the surface 20.

An example of a dispensing apparatus is given at the end of the description.

Conventional Direct Write techniques typically deposit a single, or perhaps two, layers of material on the surface. The addition of a second layer on a first layer is unlikely to affect the structural form of the first layer. However, when a number of successive layers are formed upon one another, the structural integrity of the preceding layers can be affected. It is preferable therefore, to partially cure the preceding layers prior to depositing a subsequent layer thereon. In practice, after depositing each layer or each alternate layer of material, a heat gun or other means of curing the deposited material may be applied topically to partially cure the deposited material. In providing a local means of partially curing the material it is possible to avoid having to set up the component and recalibrate or re-set the datum for the depositing apparatus. In so doing, the accuracy of the positioning system for depositing the material can be maintained. Once all of the layers, say 10 to 12 layers, have been applied to the substrate for the or each element to be formed thereon, the entire substrate can be placed in an oven or subjected to further local curing treatment to fully cure the deposited material and thus form a solid element.

Figure 2:
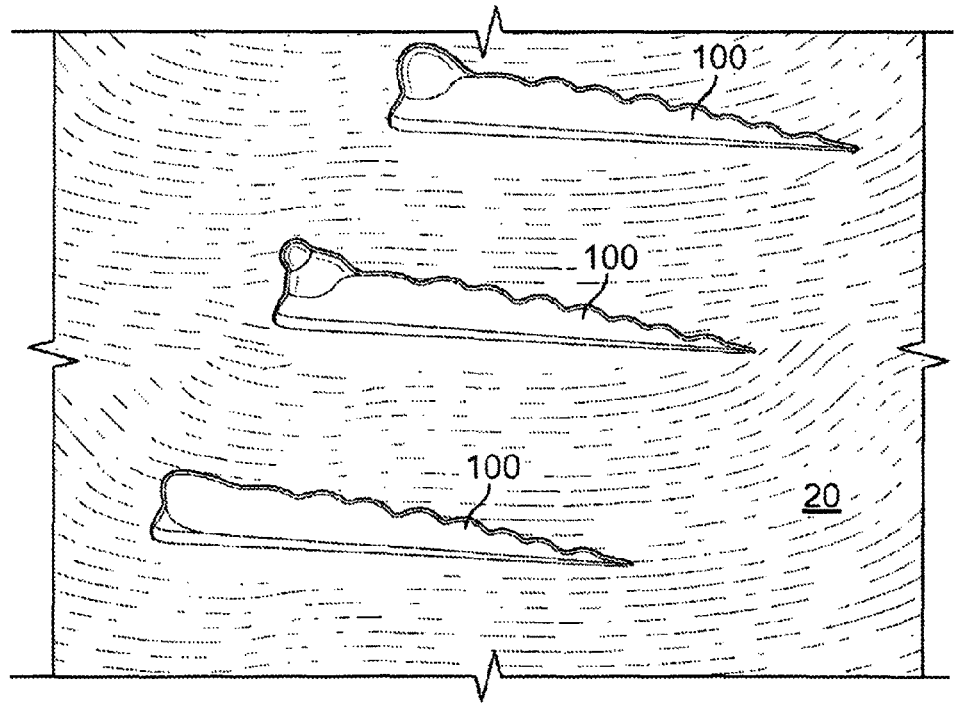
FIG. 2 illustrates three vortex generators formed as shown in FIG. 1.

FIG. 2 illustrates three completed vortex generators 100 fabricated in the manner represented in FIG. 1 formed on an aerodynamic surface 20. The completed vortex generators 100 each have a three-dimensional triangular configuration, effectively an elongate pyramid.

Figure 3:
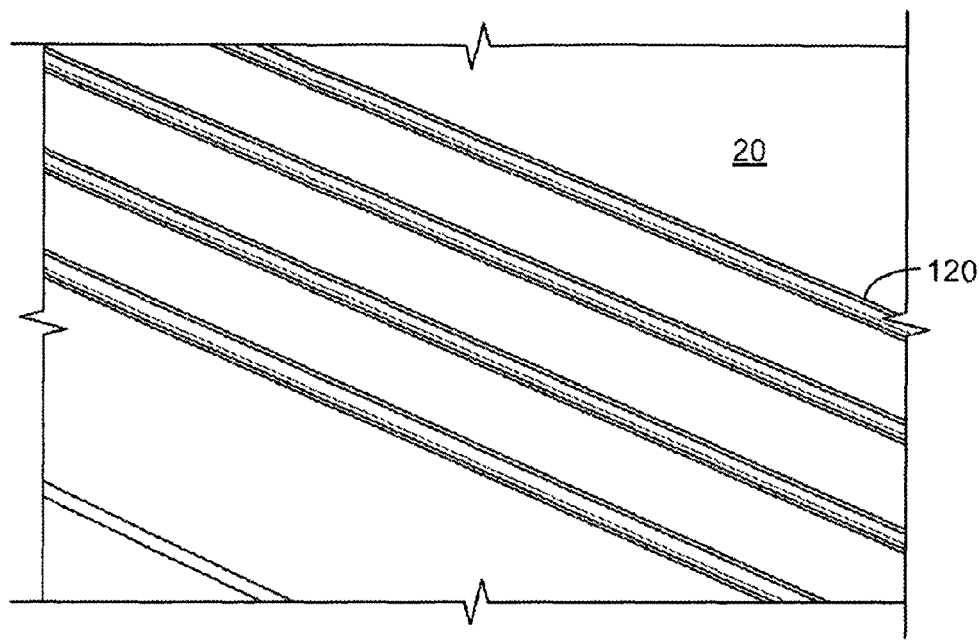
FIG. 3 illustrates laminar trip walls formed on a surface.

If the length of each deposited line of material is the same then a wall 120 is fabricated as illustrated in FIG. 3. An array of four walls 120 is illustrated in FIG. 3, the array may be used to trip the flow regime of fluid passing over the surface 20 from a lamina flow regime to a turbulent flow regime. This transition enables a large-scale phenomenon to be more accurately represented using a small-scale model in a reduced-scale wind tunnel.

The three-dimensional structure as formed by the Direct Write process may represent the completed element, for example, the wall 120 illustrated in FIG. 3. However, in some circumstances, e.g. the vortex generators 100 of FIG. 2, particular definition of the exterior of the element may be required. A machining process may, therefore, be performed after or during fabrication of the element 100.

Figure 4:
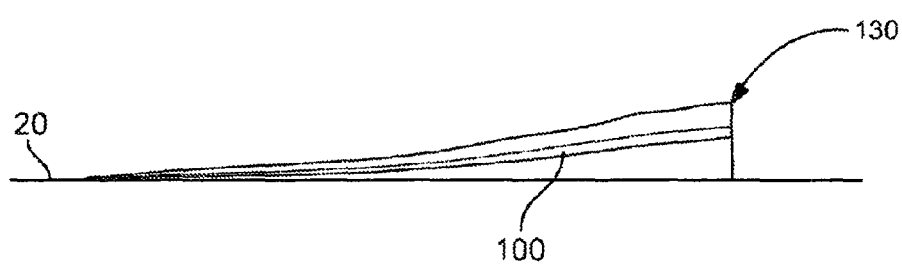
FIG. 4 illustrates a vortex generator that has been laser machined after formation.

FIG. 4 illustrates a vortex generator 100 which has been machined after the deposition process has been completed. Provision of a sharp trailing edge 130 in this way is desirable for improved vortex generation. In this example, an excimer laser (XeCl) operating with a wave length of 308 nm and a pulse length of 20 ns was used.

Alternatively, other pulsed lasers may be used, for example any excimer laser, Q-switched Nd:YAG, pulsed $CO_2$ laser or any femto or nano second laser.

The texture of the entire surface 20 or regions of the surface can be modified using the build up of deposited layers using Direct Write techniques. For example, a dimpled effect, similar to that found on the surface of a golf ball can be recreated on surface 20 by precise placement of deposited materials over the surface.

Machining can be carried out during formation of the element. For example, several layers of material can be applied and partially cured as discussed above and a machining process can be carried out on the partially formed element prior to the final curing step. Alternatively, the element may be completely formed and cured and then subsequently machined. In the example of the vortex generator discussed above, excess material deposited at the trailing edge of the vortex generator can be removed by a laser. Furthermore the stepped nature of the upper surface as illustrated in FIG. 2 can be smoothed by removing some of the material. In this way fluid will flow over the vortex generator in a smoother manner and encounter the sharp trailing edge such that improved vortices are generated thereby. In the textured surface example, layers of material can be deposited on the surface in a manner which approximates the required effect. After curing of this deposited material, excess material can be removed through laser machining to improve the accuracy and definition of the texturing.

The material deposited to form the mesoscale elements 100, 120 are provided in the form of inks. Almost any type of thermosetting ink can be used, in particular a heat curable dielectric ink (for example, D2061120D3 supplied by Gwent Electronic Materials—see website: www.g-e-m.com) may be used such that an epoxy element is fabricated. Alternatively, a powder could be deposited onto the surface directly rather than using an ink or other suspension.

Different forms of curing may be required in relation to particular materials. Many materials are cured by application of heat, in which case the component upon which the material is deposited can be inserted into a conventional or microwave oven. Alternatively, heat may be applied topically by using a laser or a heat gun. In contrast, other materials may be cured by exposure to radiation, for example ultraviolet radiation.

Figure 5:
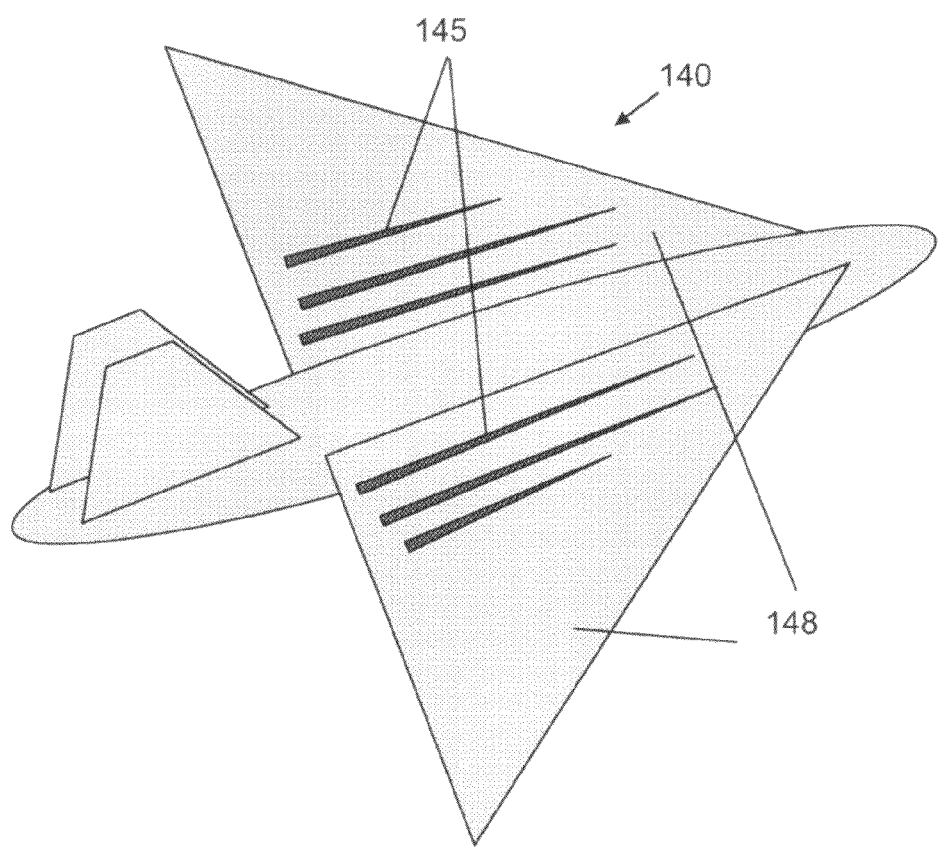
FIG. 5 illustrates a UAV having elements formed on control surfaces thereof.

FIG. 5 shows an unmanned aerial vehicle (UAV) 140 having a number of vortex generators 145 formed on a surface of each wing 148 thereof. The small scale nature of a UAV, or other small aircraft/vehicles make it difficult to accurately configure and position such disruptive elements on such a surface. If elements are provided on this kind of surface, they typically use the bonding techniques described above and have associated therewith the detrimental secondary disruptive effect to the fluid flowing over the surface.

If the material deposited on the surface 20 is an active material, such as a piezoelectric material, the dimensions of the fabricated element may change when a voltage is applied across the thickness of the element. Alternatively, when a force is exerted on the active material a voltage may be generated. These phenomena may be used in combination with the flow disruption properties discussed above to achieve a combined functionality. For example, as a fluid flow stream passes across a vortex generator 100 formed from an active material, the forces exerted on the vortex generator 100 may cause a voltage to be generated within the element itself. This voltage can be detected by providing interconnections or conducting tracks between the vortex generator 100 and a control means. The interconnections can also be formed using Direct Write technology so that the interconnections are flush or substantially flush with the surface 20.

Figure 6:
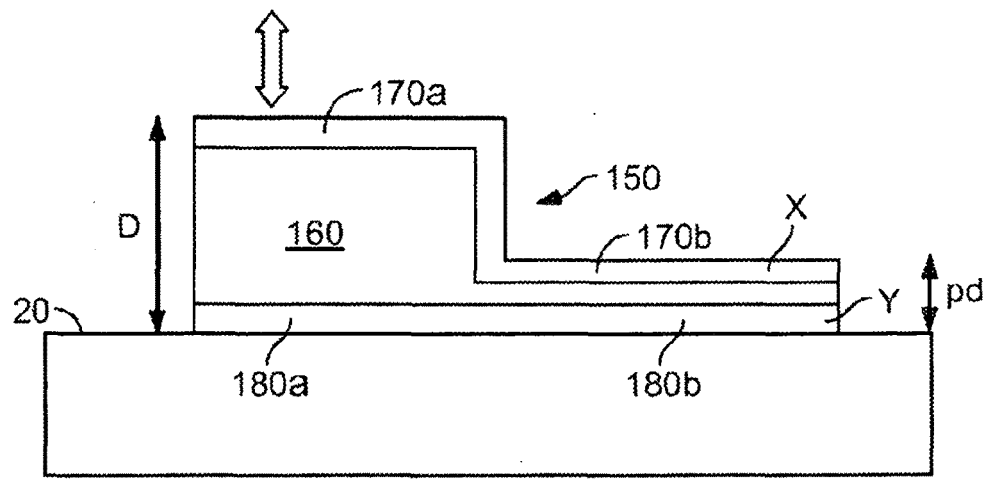
FIG. 6 illustrates a schematic representation of an element formed from electro-active material.

FIG. 6 illustrates a schematic example of a mesoscale element 150 formed from an electro-active material using Direct Write techniques. An electro-active material, such as a piezoelectric material, forms the main body 160 of the element 150. The main body 160 of the element 150 is partially encompassed by conducting material 170a, 180a which enable an electrical field to be applied to the element 150. Conducting tracks or interconnections 170b, 180b are formed on the surface 20 and extend between the element 150 and a control means (not illustrated). Each interconnection 170b, 180b comprises a respective terminal X, Y. When a voltage is applied across terminals X, Y, a change in dimension D of the main body 160 of the element 150 can be observed. In changing the profile of the aerodynamic surface 20, the characteristics of fluid flowing over the surface 20 are altered and transition to a different flow regime can be initiated.

The magnitude of the change in dimension D depends on the particular material used to form the main body 160 of the element 150, how the material has been prepared and finished, and the original dimensions of the deposited material. An example material that may be used to form the main body 160 of element 150 is an electroceramic, lead zirconate titanate. Lead zirconate titanate crystals exhibit a maximum shape change of about 0.1% of the original dimension. Other example piezoelectric materials are quartz and polyvinylidene difluoride.

Figure 7:
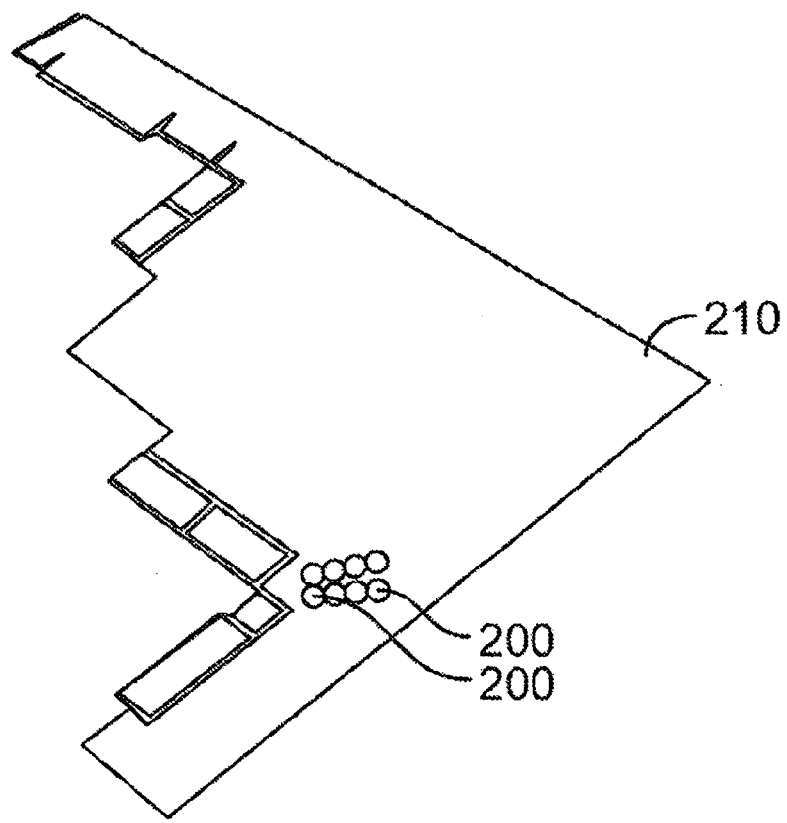
FIG. 7 illustrates location of elements on a wing for achieving flight control.

In a more sophisticated system, as illustrated in FIG. 7, electro-active actuable devices 200 can be formed on a control surface 220 of an aircraft 210. Provision of these actuable devices 200 enable the profile of the surface 220 to be manipulated so that forces experienced by the aircraft 210 are modified without needing to provide conventional, physically displaceable, control surfaces. In other words, by installing a number of actuable devices 200 a means of rudderless, non-mechanical flight control may be achieved. Alternatively, the actuable devices 200 would complement conventional control surfaces. For example, the vortex generators shown on the UAV of FIG. 5 could be formed from active material such that they have a dual functionality in that they act as vortex generators but may also detect pressures acting on the surface upon which they are formed.

Figure 8:
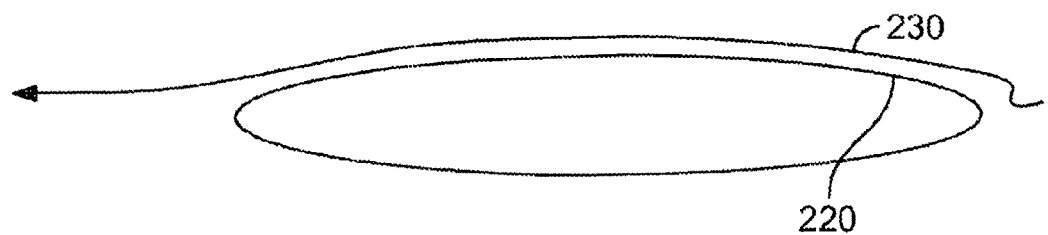
FIG. 8 illustrates a streamline over a wing having no elements.
Figure 9:
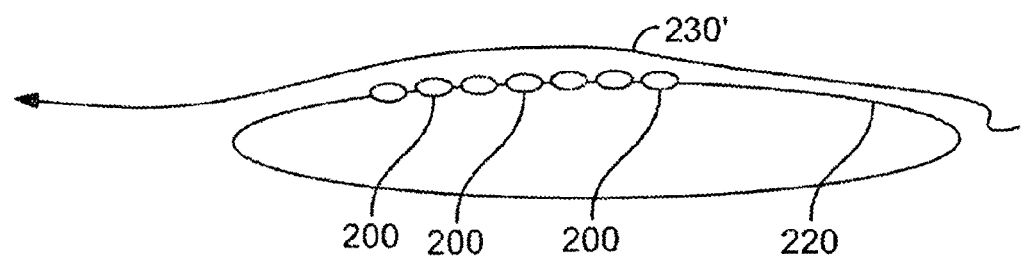
FIG. 9 illustrates a streamline over a wing comprising elements as shown in FIG. 7.

FIG. 8 illustrates a cross-section of an aerodynamic surface 220 having no actuable devices 200 installed thereon. Indeed it also represents the surface 220 having the actuable devices 200 installed but not currently actuated. A streamline 230 over the aerodynamic surface 220 is represented and clearly follows the path of the aerodynamic surface 220. In contrast, FIG. 9 illustrates a cross-section of the same aerodynamic surface 220 having a number of actuable devices 200 installed thereon as illustrated in the plan view of FIG. 7. A streamline 230' over the aerodynamic surface 220 is represented and is clearly disturbed from the path illustrated in FIG. 6 by the presence of the actuable devices 200.

Figure 10:
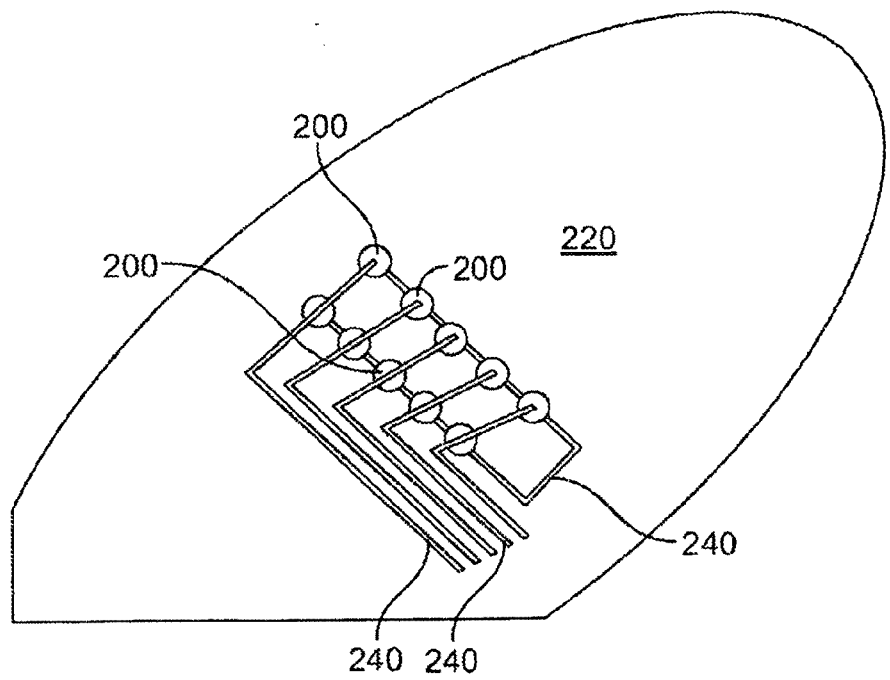
FIG. 10 illustrates an arrangement of elements on the wing illustrated in FIG. 6.

FIG. 10 illustrates the actuable devices 200 in more detail together with interconnections 240 extending between the devices 200 and a control means (not shown). Interconnections 240 are formed on the surface 220 and provide a means for supplying voltage to devices 200 from the control means. Upon receipt of said voltage, the dimension D of each respective actuable device 200 increases so that the profile of the aerodynamic surface 220 is modified. The streamline 230' is correspondingly modified and the forces experienced by the aircraft 210 are altered.

The elements 100, 120, 180, 200 can be positioned with precision and are conformal to the respective aerodynamic surface 20, 220. Furthermore, the interconnections 170b, 180b and terminals X, Y required to activate the electro-active elements 180, 200 are also directly written. Thus, the manufacture of the aerodynamic structure remains robust and lightweight with few moving parts.

Example of a Dispensing Apparatus

An nScrypt "Smart Pump" is specified to dispense lines down to 50 μm wide and onto conformal surfaces where the angle of the substrate is below 30°. The theoretical track resolution with a "micro pen" system is 100 μm using a 75 μm outer diameter tip, although the narrowest lines produced to date are approximately 230 μm wide using a 175 μm outer diameter tip.

To assist with the materials characterization and process optimization, an Intertronics DK118 Digital Dispenser is used, which is a bench top syringe system using a simple pressure regulator to provide material flow. The output pressure can be set from 1Psi to 100 Psi in increments of 1 Psi and the barrel suck-back feature prevents low viscosity materials from dripping. An I/O port allows the dispenser to be interfaced with external devices. The resolution of this dispensing technique is limited by the size and tolerance of the nozzles available. The nozzles have a stainless steel barrel and it is the outer diameter of this that indicates the width of the track. The track width and height can then advantageously be tailored by varying the offset between the substrate and nozzle or by changing the speed of the motion platform. Similarly, the quality of the starts of tracks can be improved by adjusting the timing between the XY motion start and switching on the pressure.

The offset between the Direct Write tip and the substrate must be maintained during deposition as this influences the track dimensions. If the tip is too high the ink will not flow onto the surface, and if it is too low no ink will flow and there is a danger of damaging the tip. Typically this offset is between 50 μm and 200 μm depending on the width of the track being written. A Keyence LK081 laser displacement sensor is mounted on the Z stage. This laser sensor has a working distance of 80 mm, a 70 μm spot size, a measuring range of ±15 mm and ±3 μm resolution. The accuracy of the height information provided reflects the accuracy of the XY and Z motion stages as well as the accuracy of the displacement sensor.

This system has been found to perform with a greater degree of accuracy and control than expected. The smallest nozzle available for use with the Intertronics syringe has an outer diameter of less than 200 μm, therefore the minimum track width attainable is approximately 200 μm. The digital dispenser takes less time to optimize than the Smart Pump, meaning that it is preferable to the Smart Pump where larger feature sizes are required.

It is to be understood that any feature described in relation to any one embodiment or Example may be used alone, or in combination with other features described, and may also be used in combination with one or more features of any other of the embodiments or Examples, or any combination of any other of the embodiments and Examples. Further, equivalents and modifications not described above may also be employed without departing from the scope of the invention, which is defined in the accompanying claims.

The invention claimed is:

1. A method of fabricating a three dimensional structural element on an aerodynamic surface of a component, the three dimensional structural element being configured to modify flow of a fluid passing over the aerodynamic surface, the method comprising the steps of: i) depositing one or more layers of material directly on the aerodynamic surface; and ii) then curing the deposited material on the aerodynamic surface to form the three dimensional structural element.

2. A method according to claim 1, wherein the depositing step comprises the following steps: i) depositing one or more layers of material directly on the aerodynamic surface; ii) partially curing the, or each, layer of material by locally applying heat or radiation thereto; and iii) depositing a subsequent layer of material upon the partially cured material.

3. A method according to claim 1, wherein the elements comprise a passive material.

4. A method according to claim 3, wherein the passive material is at least one of selected from the group consisting of a thermosetting epoxy and a thermoplastic epoxy.

5. A method according to claim 1, wherein the elements comprise an active material.

6. A method according to claim 5, wherein the active material is an electro-active material.

7. A method according to claim 6, wherein the electro-active material is at least one of selected from the group consisting of a piezoelectric material, a photoelectric material and a electrochemical material.

8. A method according to claim 7, wherein the electro-active material is a ceramic or a polymer.

9. A method according to claim 5, wherein the active material is a photochemical material.

10. A method according to claim 5, wherein the element is a sensor and the element comprises means for outputting a voltage.

11. A method according to claim 10, wherein the sensor is a pressure sensor.

12. A method according to claim 5, wherein the element is an actuator and comprises means for receiving a voltage.

13. A method according to claim 12, wherein the means for receiving and/or outputting a voltage is provided by at least one interconnect for providing an electrical connection between the element and a control means.

14. A method according to claim 1, wherein the element is machined during or after formation to improve the accuracy and definition of the shape thereof.

15. A method according to claim 14, wherein the machining is performed using a pulse power laser.

16. A method according to claim 15, wherein the laser is selected from the group consisting of an excimer laser (XeCL), a pulsed CO2 laser, a Q-switched Nd;YAG, or any laser having a femto or nano second pulse length.

17. A method according to claim 1, wherein the elements are formed by depositing layers of an ink, onto a surface of the component.

18. A method according to claim 17, wherein the deposited material is cured by applying heat thereto.

19. A method according to claim 18, wherein the deposited material is heated by inserting the component into an oven.

20. A method according to claim 18, wherein heat is applied to the deposited material topically using a laser, a heat gun or through exposure to microwaves.

21. A method according to claim 17, wherein the ink is cured by exposing the deposited material to ultraviolet radiation.

22. A method according to claim 17, wherein the ink is deposited on the surface using a micro-nozzle that extrudes the ink onto the surface as it moves over the component.

23. A method according to claim 17, wherein the ink is deposited on the surface using an ink jet or micro-thermal process.

24. A method according to claim 1, wherein the component is part of a vehicle.

25. A method according to claim 24, wherein the vehicle is an aircraft.

26. A method according to claim 25, wherein the aircraft is an unmanned aerial vehicle.

* * * * *